United States Patent
Ge et al.

(10) Patent No.: US 10,268,631 B2
(45) Date of Patent: Apr. 23, 2019

(54) INITIALIZE PROGRAMMABLE COMPONENTS

(71) Applicant: Hewlett Packard Enterprise Development LP, Houston, TX (US)

(72) Inventors: Changzhong Ge, Beijing (CN); Jianming Song, Beijing (CN); Kai Ren, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 152 days.

(21) Appl. No.: 15/514,123

(22) PCT Filed: Sep. 25, 2015

(86) PCT No.: PCT/CN2015/090683
§ 371 (c)(1),
(2) Date: Mar. 24, 2017

(87) PCT Pub. No.: WO2016/045609
PCT Pub. Date: Mar. 31, 2016

(65) Prior Publication Data
US 2017/0300341 A1    Oct. 19, 2017

(30) Foreign Application Priority Data
Sep. 26, 2014    (CN) .......................... 2014 1 0502449

(51) Int. Cl.
*G06F 15/177* (2006.01)
*G06F 9/445* (2018.01)
(Continued)

(52) U.S. Cl.
CPC .......... *G06F 15/177* (2013.01); *G06F 9/4401* (2013.01); *G06F 9/445* (2013.01); *G06F 15/7871* (2013.01)

(58) Field of Classification Search
CPC .... G06F 15/177; G06F 15/7871; G06F 9/445; G06F 9/4401
See application file for complete search history.

(56) References Cited

U.S. PATENT DOCUMENTS 6,629,311 B1 * 9/2003 Turner ................ G06F 17/5054
326/38
8,341,469 B2 * 12/2012 Miyama .............. G06F 11/1008
714/719
(Continued)

FOREIGN PATENT DOCUMENTS

CN       101404492 A    4/2009
CN       102033767       4/2011
(Continued)

OTHER PUBLICATIONS

International Searching Authority, "International Search Report and Written Opinion", dated Dec. 28, 2015, PCT/CN2015/090683 dated Sep. 25, 2015, 10 pages.
(Continued)

*Primary Examiner* — Stefan Stoynov
(74) *Attorney, Agent, or Firm* — Hewlett Packard Enterprise Patent Department

(57) ABSTRACT

A programming file including a first module is loaded to a programmable component. And then, the programmable component is dis-reset. Subsequently, first data is loaded to a memory connecting with the programmable component, to enable the first module in the programmable component to convert the first data of the memory into second data. After the first module of the programmable component converts the first data of the memory into the second data, a second module is loaded to the programmable component. The first module in the programming file is then replaced with the second module, to enable the second module to access the second data.

13 Claims, 4 Drawing Sheets

(51) Int. Cl.
     *G06F 9/4401*     (2018.01)
     *G06F 15/78*      (2006.01)

(56) References Cited

U.S. PATENT DOCUMENTS

| | | | |
|---|---|---|---|
| 8,402,409 B1 * | 3/2013 | Janneck | G06F 17/5054 |
| | | | 716/103 |
| 9,483,282 B1 * | 11/2016 | Vandervennet | G06F 15/7871 |
| 2008/0184024 A1 | 7/2008 | Nicklaus et al. | |
| 2013/0120022 A1 | 5/2013 | Takano et al. | |

FOREIGN PATENT DOCUMENTS

| | | |
|---|---|---|
| CN | 102043636 | 5/2011 |
| CN | 102087606 | 6/2011 |
| CN | 201886458 U | 6/2011 |
| CN | 103064695 A | 4/2013 |
| CN | 103677868 | 3/2014 |

OTHER PUBLICATIONS

Taylor et al., "ClassBench: A Packet Classification Benchmark", IEEE/ACM Transactions on Networking, vol. 15, No. 3, Jun. 2007, 13 pages.
International Preliminary Report on Patentability received for PCT Patent Application No. PCT/CN2015/090683, dated Apr. 6, 2017, 5 pages.

* cited by examiner

INITIALIZE PROGRAMMABLE COMPONENTS

BACKGROUND

To enable a programmable component to implement designated logical functions, an initialization may be performed to the programmable component.

BRIEF DESCRIPTIONS OF THE DRAWINGS

DETAILED DESCRIPTIONS

A programmable component is a programmable logic device, such as for example a field-programmable gate array (FPGA), or complex programmable logic device (CPLD). A programmable component may be programmed to carry out various functions. In one example the programmable component may form part of a network device such as a switch or router, and the functions may include, but are not limited to parsing data packets and searching a forwarding information base or access control list. Programming the programmable component may include an initialization process. The initialization process may include loading a program file into the programmable component. In some examples the initialization may also include loading data into a memory accessible to the programmable component. Loading a program file into the programmable component may include configuring logic circuitry of the programmable component to perform certain desired functions according to the program file. In a conventional approach a CPU first loads data of a first format ('first data') into a memory attached to the CPU and then converts the data to a second format ('second data') which is usable by the programmable component. The CPU may then transfer the second data to a memory that is accessible to the programmable component. However, this approach puts a great load on the CPU and may result in slow initialization if the CPU does not convert the data as quickly as desired.

Figure 1A:
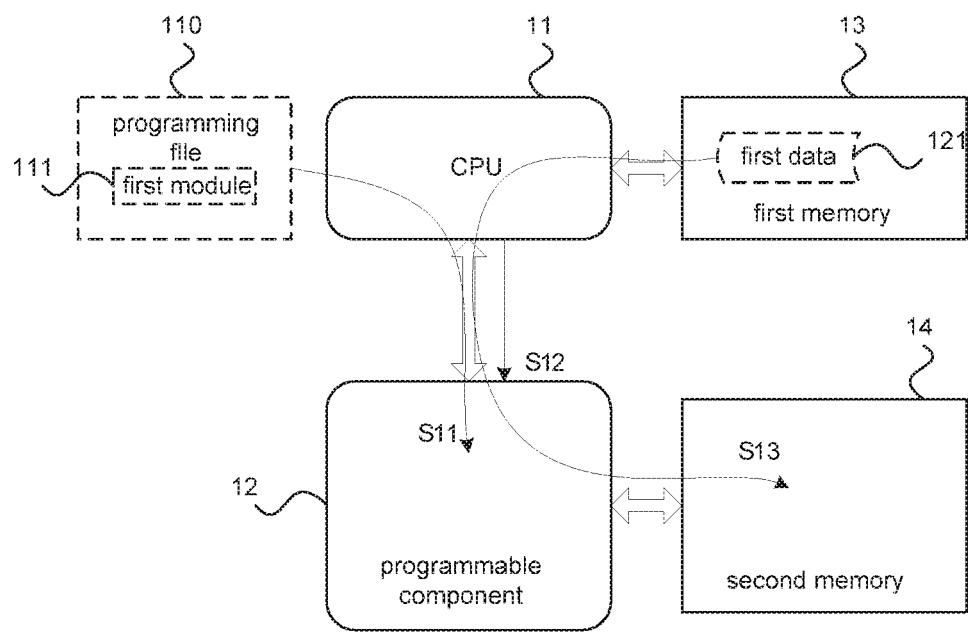
FIG. 1a to FIG. 1c are schematic diagrams illustrating how to initialize a programmable component, in accordance with an example of the present disclosure.
Figure 1B:
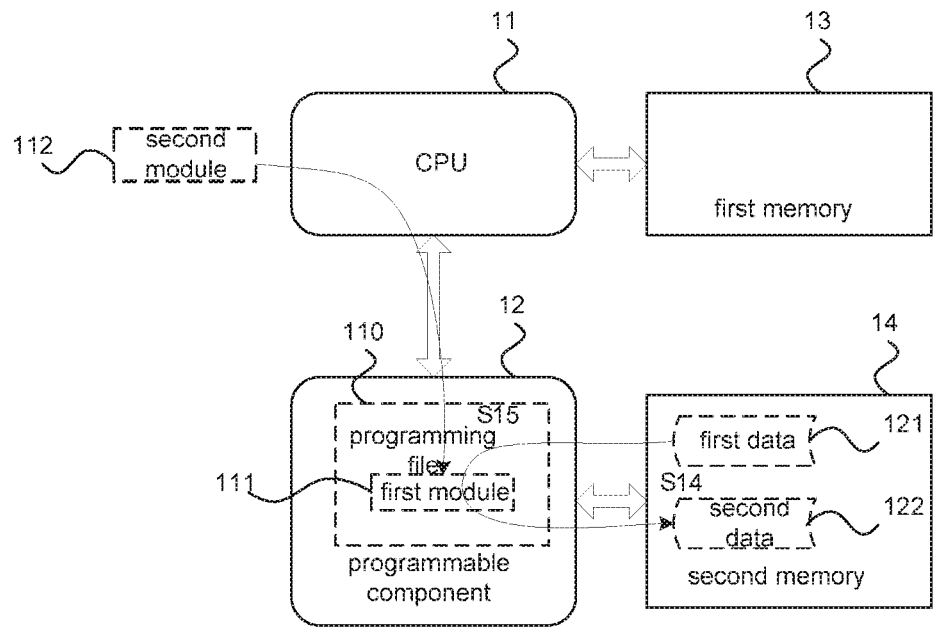
Figure 1C:
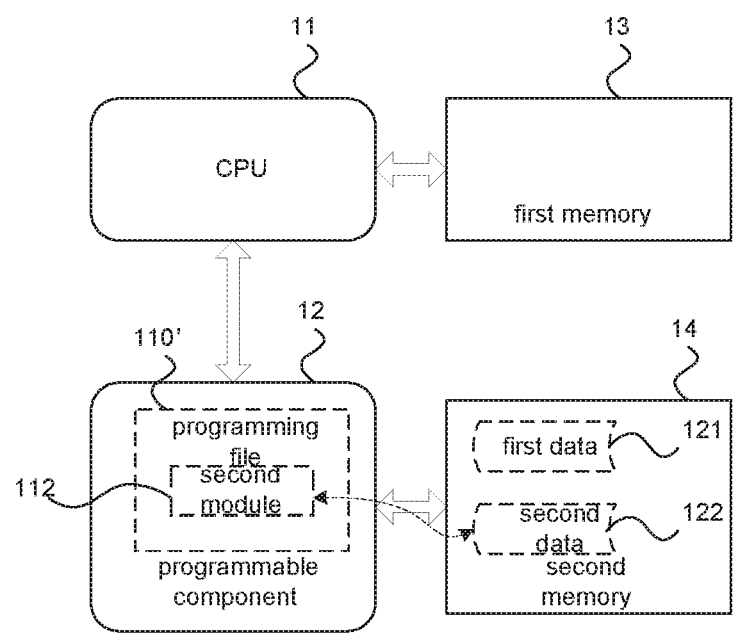

The present disclosure proposes an approach in which the programmable device converts the first data to second data. FIG. 1a to FIG. 1c are schematic diagrams illustrating how to initialize a programmable component, in accordance with an example of the present disclosure. With reference to FIG. 1a to FIG. 1c, in an example, a processor such as central processing unit (CPU) 11 may take charge of initialization of a programmable component 12.

In the example, the CPU 11 is connected with the programmable component 12. For example, the CPU 11 may be connected with the programmable component 12 through an interface, such as a peripheral component interconnect express (PCIE) bus interface. The CPU 11 may also be connected with a first memory 13. The programmable component 12 may be connected with a second memory 14. First memory 13 and second memory 14 may be physical memory. For example the first memory and second memory may be random access memories.

In the example, after completing the initialization, logical functions implemented on the programmable component 12 may rely on data provided by the CPU 11. Besides, during the initialization process of the programmable component 12, format of such data may be converted into another format suitable for usage of the programmable component 12. In the example, the programmable component 12 may complete the data conversion. To facilitate descriptions, the data before conversion may be referred to as first data 121. And the data after conversion may be referred to as second data 122. In certain scenarios, some modes, such as compile, may be employed when converting data. Correspondingly, the first data 121 may be understood as raw data. And the second data 122 may be understood as compiled data.

As shown in FIG. 1a to FIG. 1c, initialization for the programmable component 12 in the example may be achieved by performing the operations in FIG. 1a, followed by the operations in FIG. 1b, after which the programmable component is initialized and may operate as shown in FIG. 1c.

The programmable component may be first set to a reset state. The reset state is a state in which the programmable component does not operate logical functions may be programmed by an external device such as a processor. In contrast to a working state is a state in which the programmable component may carry out logical functions which it has previously been programmed with.

In S11, the programmable component is in a reset state and the processor or CPU 11 may load a programming file 110 including a first module 111 to programmable component 12. The programming file 110 may include other modules in addition to the first module 111. For instance, in addition to the first module 111, the programming file 110 may at least further include an interface managing module, which manages a communication interface between the programmable component 12 and the CPU 11, as well as a communication interface between the programmable component 12 and the second memory 14. Furthermore, the programming file 110 may further support other modules, which implement logical functions of the programming file 110. Loading the programming file into the programmable component 12 may enable the programmable component to implement functions corresponding to the programming file, e.g., compile data or search for data, and so on.

In S12, the CPU 11 may dis-reset the programmable component 12, to enable the programmable component 12 to enter a work state based on the programming file 110. The dis-resetting here refers to terminating the reset state of the programmable component, to enable the reset programmable component to start running. Dis-resetting may also be referred to as switching the programmable component to a working state.

In S13, the CPU 11 may load the first data 121, which has been loaded into the first memory 13 connected therewith, into the second memory 14 connected with the programmable component 12. As mentioned above, the programming file 110 may include an interface managing module, which manages a communication interface between the programmable component 12 and the CPU 11, as well as a communication interface between the programmable component 12 and the second memory 14. Thus, the CPU 11 may access the second memory 14 connected with the programmable component 12, through the programmable component 12 when the programmable component is in the work state.

In S14, the first module 111 in the programmable component 12 may convert the first data 121 of the second memory 14 into the second data 122.

In S15, the CPU 11 may load the second module 112 into the programmable component 12, and replace the first module 111 in the programming file 110 with the second module 112. That is, after replacing the first module 111 in the programming file 110 with the second module 112, the programming file 110 shown in FIG. 1a and FIG. 1b may be replaced with programming file 110' shown in FIG. 1c. Thus, the second data 122 stored in the second memory 14 may be accessed by the second module 112 in the programmable component 12.

Compared with loading the entire programming file 110 in S11, in S15, partial loading may be employed by the CPU 11 to load the second module 112 to the programmable component 12. Partial loading here refers to loading a part of the programming file 110. The partial loading is mainly used for partial substitution for the programming file 110. Partial loading allows a new program module to be loaded into the programmable component while the programmable component is in a work state and still able to carry out operations in accordance with previously loaded program modules.

S15 may be executed, after a router, switch or other device to which the programmable component 12 belongs, completes the initialization. That is, S15 may be executed, after the device to which the programmable component 12 belongs is running normally, by utilizing designated logical functions implemented on the programmable component 12. The second module 112 may support logical functions implemented on the programmable component 12, by accessing the second data 122. For instance the second data may be compiled data of a forwarding information base or access control list etc and the second module may include functions to search the compiled data.

Based on the foregoing principle of the example, it can be seen that it is the programmable component 12, not the CPU 11, which takes charge of the data conversion, during the initialization process. This reduces the load on the CPU and may also result in faster initialization, as the programmable component will generally conduct operations faster than the CPU.

In the foregoing example, the programmable component 12 may be a component supporting the partial loading. If the programmable component 12 is FPGA, the programming file 110 may use a raw binary file (RBF) format, or a binary format. In other examples, the programming file 110 may be a file in another similar format supporting the partial loading. The partial loading is used for replacing some modules in the programming file, to enable the programmable component to implement functions of other programming files.

The programmable component and the CPU may belong to the same device, for example a network device such as a switch, or router, or another computing device. Compared to a conventional approach in which a CPU converts the first data into second data, the above example may shorten the initialization time of the device, to which the CPU 11 and the programmable component 12 belong. In addition to the initialization of the programmable component, the CPU may perform various post startup operations relating to configuration of a device, such as a switch, router or other computing device, to which the CPU and the programmable component belong. A post startup operation is an operation which is commenced after the initialization of the programmable device has begun and which relates to parts of the device other than the programmable component. As the CPU is not involved in certain the initialization operations which are delegated to the programmable device, the CPU may perform some or all of the post startup operations at the same time as the programmable device performs some of the initialization operations. As illustrated in FIGS. 3a and 3b this may shorten the initialization time of the device which the programmable component and CPU belong to. This is in contrast to an approach in which the CPU directly manages all of the initialization operations.

Figure 2A:
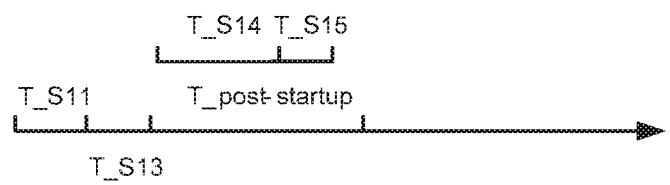
FIG. 2a and FIG. 2b are sequence diagrams illustrating how to initialize a programmable component, in accordance with the example shown in FIG. 1a to FIG. 1c.
Figure 2B:
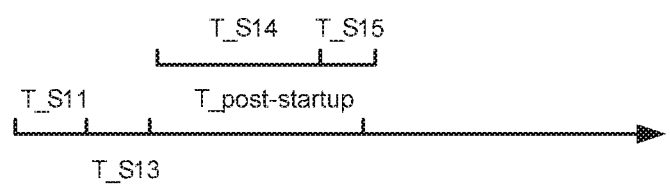
Figure 3:
FIG. 3 is a sequence diagram illustrating how to initialize a programmable component, in accordance with the comparative example.

FIG. 2a and FIG. 2b are sequence diagrams illustrating a time line of initializing a programmable component and post start-up operations in accordance with the example shown in FIG. 1a to FIG. 1c. FIG. 3 is a comparative example showing a time line of the initialization when, contrary to FIGS. 1a to 1c, the CPU converts the first data to second data.

Please refer to FIG. 2a and FIG. 2b, and take into account of FIG. 1a to FIG. 1c, in the foregoing example, time occupied by the CPU 11 when dis-resetting the programmable component 12 during the initialization process may be omitted. Correspondingly, the time consumed by the initialization process in the example mainly includes as follows.

Time T_S11 consumed, when the CPU 11 loads the programming file 110 to the programmable component 12.

Time T_S13 consumed, when the CPU 11 loads the first data 121 to the second memory 14.

Time T_S14 consumed, when the programmable component 12 converts the first data 121 into the second data 122.

Time T_S15 consumed, when the CPU 11 loads the second module 112 to the programmable component 12 with partial loading.

And, time T_post-startup consumed by the post-startup process.

As mentioned above, it can be seen that among the time T_S11, T_S13, T_S14 and T_S15 involved in the initialization process of the example, the CPU 11 may be occupied by T_S11, T_S13 and T_S15, but the CPU is not occupied by T_S14.

Therefore, after loading the first data 121 to the second memory 14 at T_S15, the CPU 11 may start to execute the post-startup operations, so as to facilitate to complete initialization of the device to which the CPU 11 belongs. Meanwhile, while the CPI is executing post-startup operations, the programmable component 12 may start to convert the first data 121 into the second data 122. Thus, time T_S14 and T_post-startup in the foregoing example may occur in parallel. Correspondingly, total initialization time of the device in the example may be denoted as follows.

T_S11+T_S13+Max(T_post-startup, T_S14+T_S15). Max( ) therein may denote a function to obtain the maximum value.

Please refer to FIG. 3, which is a comparative example showing time occupied by the CPU 21 in an approach in which the CPU manages all of the initialization operations.

Time T_S21 consumed, when the CPU 21 loads the programming file 210 to the programmable component 22, which is the same as, or basically the same as T_S11 shown in FIG. 2a.

Time T_S23 consumed, when the CPU 21 converts the first data 221 into the second data 222.

Time T_S24 consumed, when the CPU 21 loads the second data 222 to the second memory 24, which is the same as, or basically the same as T_S13 shown in FIG. 2a.

And, time T_post-startup consumed during the post-startup process.

As mentioned above, it can be seen that the CPU is occupied during all the time T_S21, T_S23 and T_S24 involved in the initialization process of the comparative example.

Thus, total initialization time of the device in the comparative example may be denoted as follows.

T_S21+T_S23+T_S24+T_post-startup.

Figure 4:
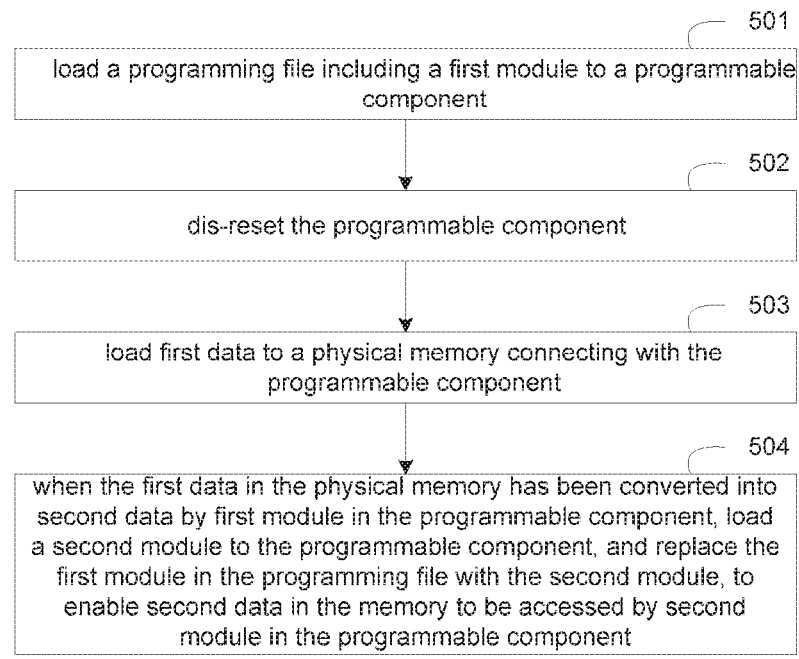
FIG. 4 is a flowchart illustrating a method for initializing a programmable component, in accordance with an example of the present disclosure.

Comparing the example of FIG. 2a with the example of FIG. 4, it can be seen that occupancy rate of the CPU 21 in the comparative example of FIG. 4 is 100%, when initializing the programmable component 22. However, in the example of FIG. 3a, occupancy rate of the CPU 11 when initializing the programmable component 12 is [T_S11+T_S13+T_S15]/[T_S11+T_S13+T_S14+T_S15], which is less than 100%. Thus, compared with the comparative example of FIG. 3, the example of FIG. 2a may reduce the occupancy rate of the CPU 11 during the initialization process of the programmable component 12.

For most of the devices, time consumed by the post-startup operations may be not shorter than sum of time consumed by data conversion and data loading. That is, in the foregoing example, as shown in FIG. 2a, T_post-startup is longer than, or equal to T_S14+T_S15. Based on foregoing time equivalence relationship, difference of total initialization time of device between the FIG. 2a and FIG. 3 may be denoted by T_S23 approximately. Thus, compared with the comparative example, the foregoing example may still shorten the total initialization time of the device, so as to accelerate initialization of the device. Moreover, shortened time of the initialization time may be T_S23, which is consumed by the CPU 21 when converting the first data 221 into the second data 222. Subsequently, acceleration of the device's initialization may be more evident.

In some cases, T_post-startup in the foregoing example may be shorter than (T_S14+T_S15) as shown in FIG. 2b. At this time, as long as (T_S14+T_S15)<(T_S23+T_post-startup), compared with FIG. 3, the example of FIG. 2b may further shorten the total initialization time of the device, so as to accelerate the initialization of the device. After measuring with experiments, it can be seen that T_S14 may be shorter than T_S23. Besides, T_S15 and T_post-startup may have little impact on the relationship between T_S14 and T_S23. Thus, it is probable for (T_S14+T_S15) to be shorter than (T_S23+T_post-startup).

Furthermore, in FIG. 2b, when contents in the first data 121 are changed, the second data 122 may be updated correspondingly, in response to the changed contents in the first data 121. The CPU 11 may detect that contents in the first data 121 have been changed, and employ the partial loading mode to load the first module 111 to the programmable component 12, and replace the second module 112 in the programming file 110' with the first module 111. That is, the programming file 110' shown in FIG. 1c may be changed back to the programming file 110 shown in FIG. 1a and FIG. 1b. Besides, the first module 111 may convert the updated first data 121 into updated second data 122. And then, the CPU 11 may employ the partial loading mode to load the second module 112 to the programmable component 12, and replace the first module 111 in the programming file 110 with the second module 112. That is, the programming file 110 shown in FIG. 1a and FIG. 1b may be replaced with the programming file 110' shown in FIG. 1c. That is, modules of logical functions born by the programmable component 12 may be continuously supported, by accessing the updated second data 122 with the second module 112. That is, the initialization principle in the foregoing example may be further applicable to upgrade maintenance of the programmable component 12. However, such module switching may be not achieved in the comparative example.

FIG. 4 is a flowchart illustrating a method for initializing a programmable component, in accordance with another example of the present disclosure. Based on similar principles of the example shown in FIG. 1a to FIG. 1c, in another example shown in FIG. 4, a method for initializing a programmable component may include the following blocks.

In block 501, load a programming file including a first module to a programmable component.

In block 502, dis-reset the programmable component.

In block 503, load first data to a memory connecting with the programmable component.

In block 504, after the first data in the memory has been converted into the second data by the first module in the programmable component, load the second module to the programmable component, and replace the first module in the programming file with the second module, such that the second data stored in the memory may be accessed by the second module in the programmable component.

When applying the method to a network device, such as a switch, router, firewall or other electronic device, the method may further include as follows. When the first data in the memory starts to be converted into the second data by the first module in the programmable component, the post-startup operations may be executed, so as to facilitate the initialization of a corresponding device. The time consumed by the post-startup operations may be longer than, or equal to the time, which is consumed when converting the first data into the second data.

The first data may be changed. Subsequently, there may be a difference between the updated first data and the previous first data corresponding to the second data in the second memory, which is obtained after being compiled. Thus, the updated first data may be re-compiled, so as to generate the new second data. After the CPU detects that the first data has been changed, the method may further include as follows. Load the first module to the programmable component, and replace the second module in the programming file with the first module, to adapt to the upgrade maintenance of the programmable component.

The foregoing method may be run in the CPU 11 in the example shown in FIG. 1a to FIG. 1c, or a component similar to the CPU 11. Besides, the programmable component and memory in the foregoing method may respectively be the programmable component 12 and the second memory 14 in the example, as shown in FIG. 1a to FIG. 1c, or a component respectively similar to the programmable component 12 and the second memory 14.

Figure 5:
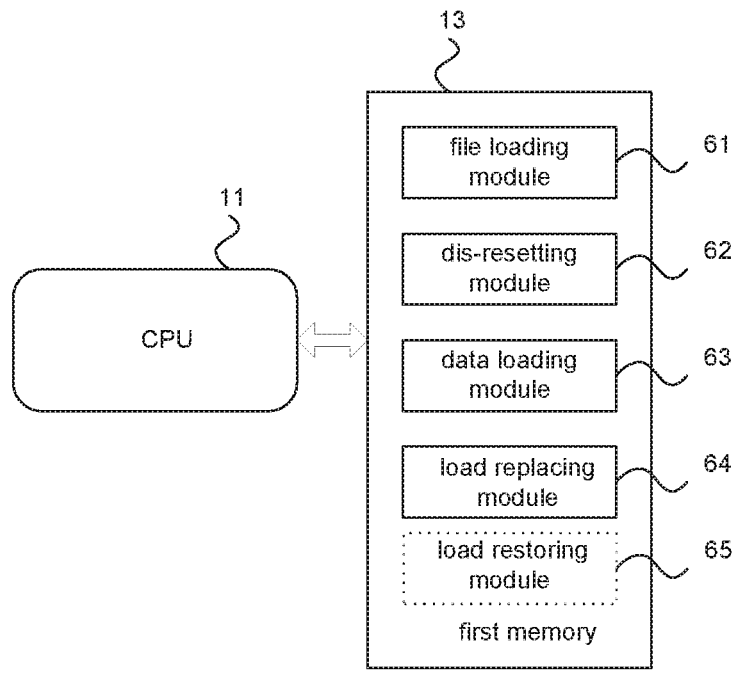
FIG. 5 is a logical diagram illustrating how to initialize a programmable component, in accordance with another example of the present disclosure.

FIG. 5 is a logical diagram illustrating an apparatus for initializing a programmable component, in accordance with another example of the present disclosure. Based on the principle similar to that in the example shown in FIG. 1a to FIG. 1c, in another example shown in FIG. 5, a device which may initialize a programmable component may include a file loading module 61, a dis-resetting module 62, a data loading module 63 and a load replacing module 64.

The file loading module 61 is to load a programming file including a first module to a programmable component.

The dis-resetting module 62 is to dis-reset the programmable component.

The data loading module 63 is to load first data to a memory, which is connected with the programmable component.

The load replacing module 64 is to load a second module to the programmable component, and replace the first module in the programming file with the second module, after the first data in the memory has been converted into the second data by the first module in the programmable component. The second data may be stored into the memory, and be accessed by the second module. The above mention modules may be implemented as machine readable instructions stored in a non-transitory storage medium, such as a memory or disk, and executable by a processor such as the CPU.

When the device is applied to a network device, such as an electronic device, the device may further execute the post-startup operations, after the first data in the memory starts to be converted into the second data by the first module in the programmable component, so as to facilitate the initialization of a corresponding device. Time consumed by the post-startup operations may be longer than, or equal to the time, which is consumed when converting the first data into the second data.

The first data may be changed. Subsequently, there may be a difference between the updated first data and previous first data, which corresponds to the second data in the second memory obtained after being compiled. Thus, the updated first data may be re-compiled to generate new second data. The device may further include a load restoring module 65. When the first data is changed, the load restoring module 65 may load the first module to the programmable component, and replace the second module in the programming file with the first module, so as to adapt to the upgrade maintenance of the programmable component.

As shown in FIG. 5, the foregoing device may be loaded in the first memory 13, and be called by the CPU 11, as in the example shown in FIG. 1a to FIG. 1c. Besides, the programmable component and memory in the foregoing device may respectively be the programmable component 12 and the second memory 14, as in the example shown in FIG. 1a to FIG. 1c.

Alternatively, the foregoing device may also be loaded in a component similar to the first memory 13, and be called by a component similar to the CPU 11. Besides, the programmable component and memory in the foregoing device may be components, which are respectively similar to the programmable component 12 and the second memory 14.

Besides, in another example, a network device, such as a switch or router, may include the CPU 11, the programmable component 12, the first memory 13 and the second memory 14, as in the example shown in FIG. 1a to FIG. 1c. The CPU 11 in the network device may run the method shown in FIG. 4. Alternatively, the CPU 11 in the network device may call the device born by the first memory 13, as shown in FIG. 5.

Besides, the second data may include forwarding information of data plane, e.g., forwarding information base (FIB) information, or access control list (ACL) information, and so on. Correspondingly, by accessing the second data, the second module may support the forwarding function of data plane, which is born by the programmable component 12.

In the foregoing examples shown in FIG. 1a to FIG. 1c, FIG. 2a to FIG. 2b, FIG. 4 and FIG. 5, the initialization of the programmable component may be partially born by the programmable component. Thus, additional resources occupied by the initialization of the programmable component may be reduced.

The invention claimed is:

1. A method for initializing a programmable component, comprising:

loading a programming file comprising a first module to the programmable component;

dis-resetting the programmable component;

loading first data to a memory connecting with the programmable component;

after the first module converts the first data of the memory into second data, loading a second module to the programmable component, and replacing the first module in the programming file with the second module, to enable the second module in the programmable component to access the second data in the memory.

2. The method according to claim 1, further comprising:

executing a post-startup operation, after the first module of the programmable component starts to convert the first data of the memory into the second data, wherein a first duration of the post-startup operation is longer than, or equal to, a second duration during which the first data is converted into the second data.

3. The method according to claim 1, further comprising:

loading the first module to the programmable component, and replacing the second module in the programming file with the first module, after the first data is converted to second data.

4. The method according to claim 1, wherein loading the second module to the programmable component is implemented by employing a partial loading mode.

5. A device for initializing a programmable component, comprising a file loading module, a dis-resetting module, a data loading module, and a load replacing module, wherein the file loading module is to load a programming file comprising a first module to the programmable component;

the dis-resetting module is to dis-reset the programmable component;

the data loading module is to load first data to a memory, which is connected with the programmable component; and, the load replacing module is to load a second module to the programmable component, and replace the first module in the programming file with the second module, after the first module of the programmable component converts the first data of the memory into second data, to enable the second module in the programmable component to access the second data stored in the memory.

6. The device according to claim 5, wherein the device further comprises a post-startup module, which is to execute a post-startup operation, after the first module in the programmable component starts to convert the first data of the memory into the second data, wherein a first duration of the post-startup operation is longer than, or equal to a second duration, during which the first data is converted into the second data.

7. The device according to claim 5, wherein the device further comprises a load restoring module, which is to load the first module to the programmable component, and replace the second module in the programming file with the first module, when the first data is changed.

8. The device according to claim 5, wherein the load replacing module is to load the second module to the programmable component, by employing a partial loading mode.

9. A network device, comprising a central processing unit (CPU), a programmable component, a first memory connecting with the CPU, and a second memory connecting with the programmable component, wherein the CPU is to load a programming file comprising a first module to the programmable component, dis-reset the programmable component, load first data of the first memory to the second memory;

when the first module in the programmable component converts the first data of the second memory into second data, the CPU is further to load a second module to the programmable component, and replace the first module in the programming file with the second module, to enable the second module in the programmable component to access the second data in the second memory.

10. The network device according to claim 9, wherein the second data comprises forwarding information of a data plane.

11. The network device according to claim 9, wherein the CPU is further to execute a post-startup operation, after the first module in the programmable component starts to convert the first data of the memory into the second data, a first duration of the post-startup operation is longer than, or equal to a second duration, during which the first data is converted into the second data.

12. The network device according to claim 9, wherein the CPU is further to load the first module to the programmable component, and replace the second module in the programming file with the first module, when detecting that the first data is changed.

13. The network device according to claim 9, wherein the CPU is to load the second module to the programmable component by using a partial loading mode.

* * * * *